Oct. 22, 1963  R. H. ROYSTER  3,107,933
EXTENSIBLE AND RETRACTABLE DEVICE HAVING MANUALLY
RELEASABLE POSITIVE LOCKING MEANS
Filed May 17, 1961  3 Sheets-Sheet 2

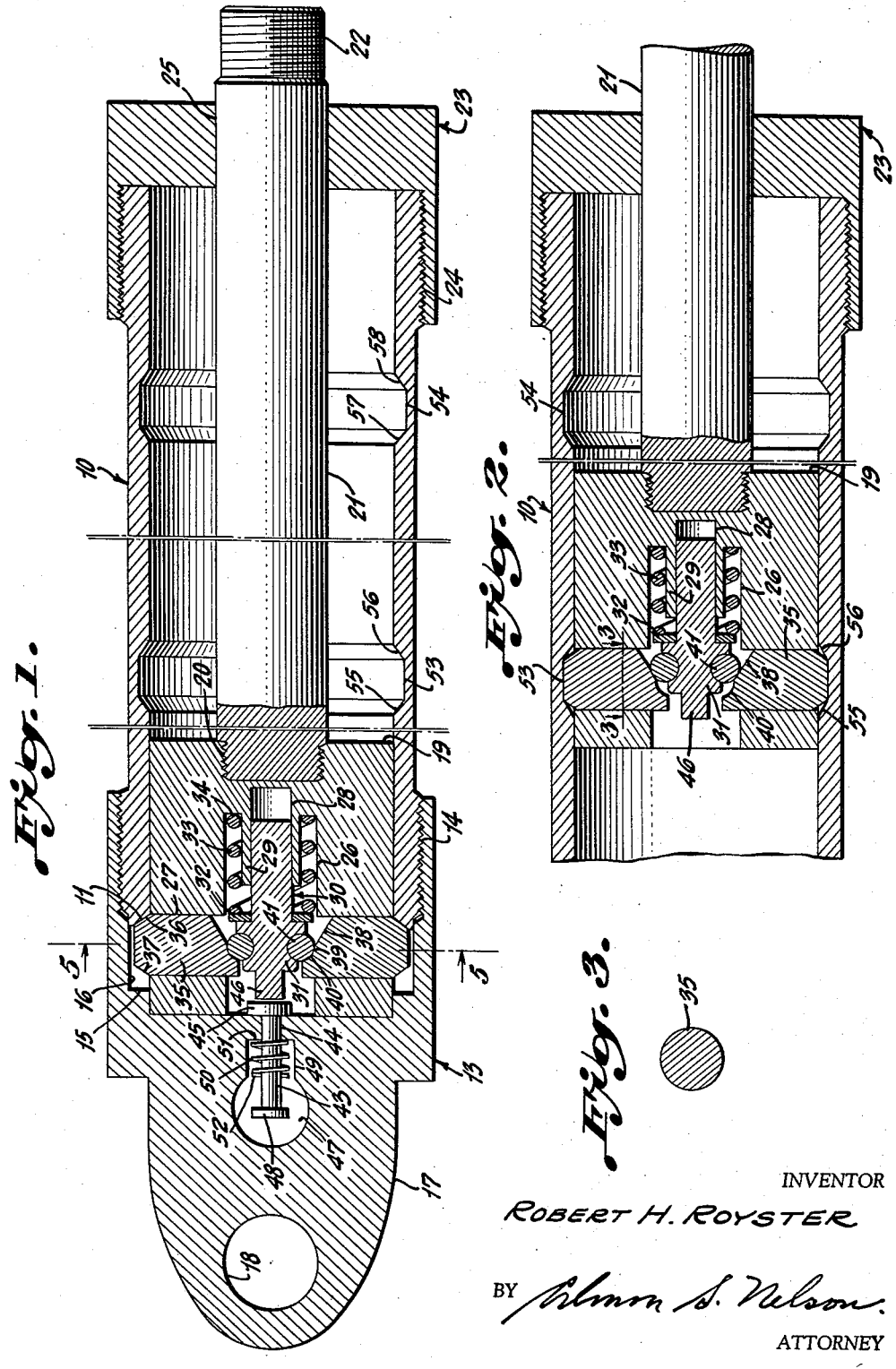

INVENTOR
ROBERT H. ROYSTER
BY
ATTORNEY

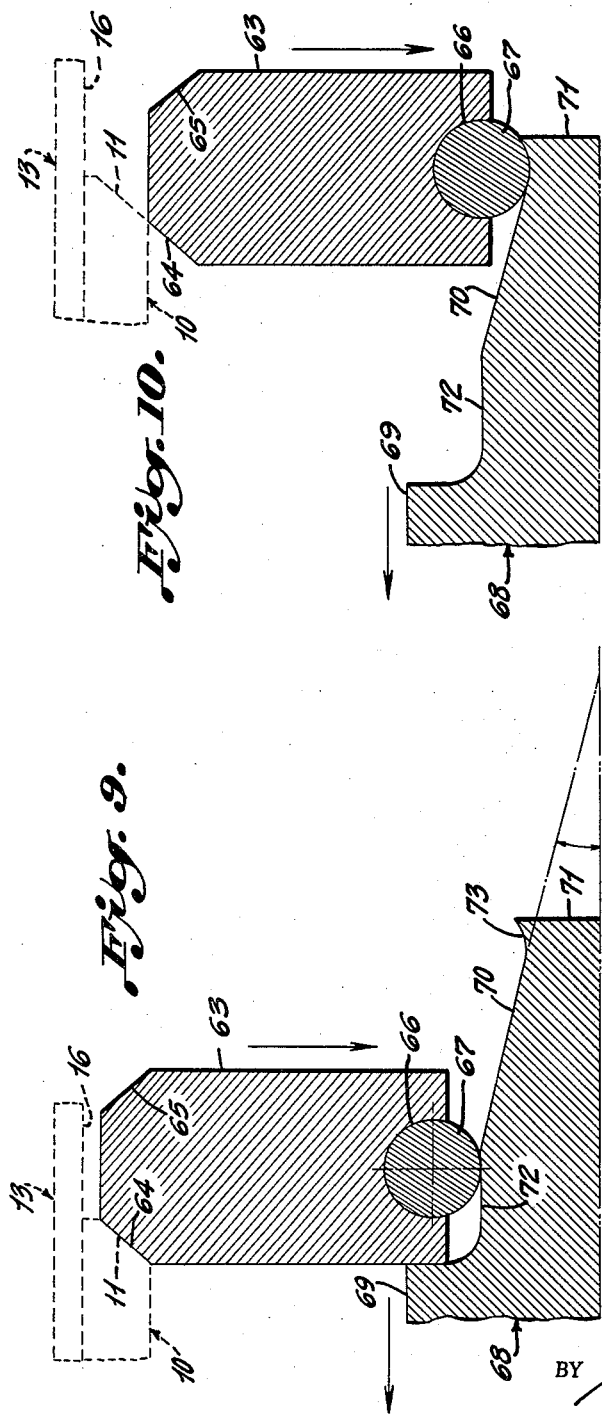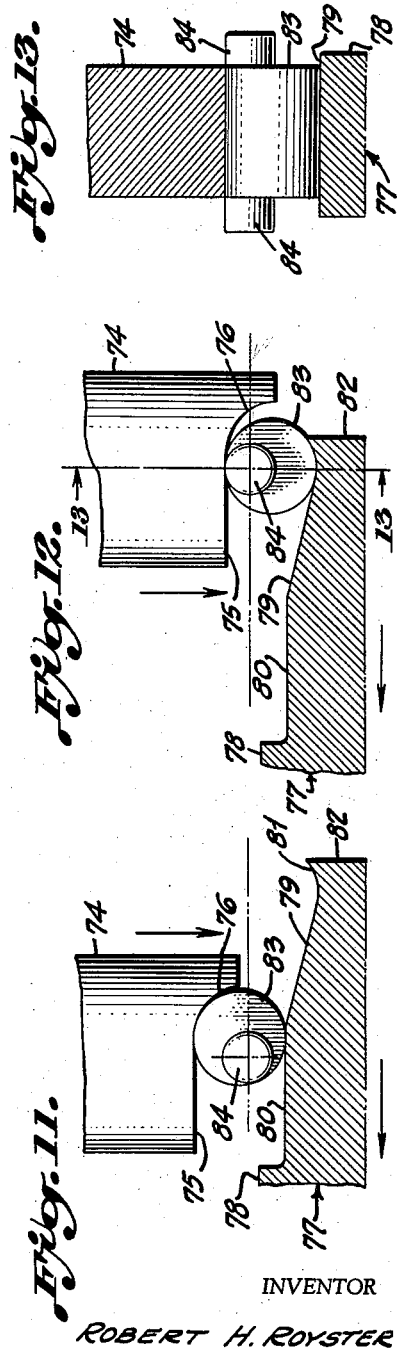

United States Patent Office 3,107,933
Patented Oct. 22, 1963

3,107,933
EXTENSIBLE AND RETRACTABLE DEVICE HAVING MANUALLY RELEASABLE POSITIVE LOCKING MEANS
Robert H. Royster, Pasadena, Calif.
(718 Poinsettia, Corona del Mar, Calif.)
Filed May 17, 1961, Ser. No. 110,673
5 Claims. (Cl. 287—58)

This invention relates to extensible and retractable devices and more particularly to such devices which may be utilized as struts or props and incorporating a manually releasable positive locking means for locking the device in a retracted position, such locking means also serving to releasably lock the device in one or more extended positions from which the same may be released by the application of an excess force thereto.

Heretofore many different types of extensible and retractable devices for use as struts, props or braces have been proposed and utilized and many of these devices incorporated numerous types of locking devices which have proved satisfactory for certain applications, but in other uses have been relatively unsatisfactory. Where the device need not be enclosed, relatively simple pawl and ratchet locking mechanisms have proved satisfactory, but where the enclosure of the device is necessary, in some instances, relatively delicate toggle mechanisms have been utilized as an integral part of the locking means and frequent failure of such locking mechanism has been experienced. Such locking mechanisms, furthermore, are relatively complex and costly to manufacture and furthermore, repair or replacement thereof upon failure has also been relatively costly. Also in some instances as the result of wear, play has developed between the parts of the locking mechanism which has sometimes resulted in failure to provide a positive lock with the result that inadvertent movement of the extensible element of the device has taken place which, in certain instances, could be disastrous.

It is accordingly an object of the invention to provide an extensible and retractable device, including a manually releasable positive locking means which may be conveniently and economically constructed from readily available materials and which will provide a positive lock in the desired position, regardless of wear or play between the parts.

A further object of the invention is the provision of an extensible and retractable device, including a manually releasable positive locking means in which the locking mechanism is relatively simple and eliminates the use of levers or toggle mechanisms thereby reducing likelihood of failure to a minimum.

A still further object of the invention is the provision of an extensible and retractable device, including manually releasable postive locking means in which the locking action is accomplished by a combination of spring means and locking cam means which operates to positively hold the locking elements in locking position until released by actuation of a manually operable releasing means.

Another object of the invention is the provision of an extensible and retractable device, including manually releasable positive locking means in which a piston is slidably received in a cylinder and in which the locking means serves to positively lock the piston against movement at one end of the cylinder, means also being provided for releasably locking the piston at one or more other positions in the cylinder, release from such other position being accomplished by the application of an excess force to the piston to move the same in the cylinder.

A further object of the invention is the provision of an extensible and retractable device, including manually releasable positive locking means in which the locking means includes radially movable locking detents in the form of bolts and in which two, three or four circumferentially spaced bolts may be utilized, depending upon the size and load requirements, while still utilizing the same basic locking mechanism.

A still further object of the invention is the provision of an extensible and retractable device, including manually releasable positive locking means in which the locking means includes radially movable locking detents actuated by locking cam means, including inclined and flat surfaces in contact with cam rollers, all of the parts being in contact at all times and in compression, thereby providing a particularly strong structure and reducing the likelihood of failure.

Another object of the invention is the provision of an extensible and retractable device, including manually releasable positive locking means in which the locking means includes radially movable locking detents actuated by locking cam mechanism, including inclined and flat surfaces and cam rollers engaging the same in which the inclined and flat surfaces are provided on the locking detents and the cam rollers are retained in a plunger actuated by spring pressure.

A further object of the invention is the provision of an extensible and retractable device, including manually releasable positive locking means in which the locking means includes radially movable detents actuated by locking cam means including inclined and flat surfaces engaged by cam rollers and in which such rollers are retained in the inner ends of the locking detents and the inclined and flat surfaces are provided on a plunger actuated by spring pressure.

A still further object of the invention is the provision of an extensible and retractable device, including manually releasable positive locking means and in which the locking means includes radially movable locking detents which are actuated by locking cam means, including inclined and flat surfaces engaged by a roller and in which a flat surface is provided on the inner end of each detent and inclined and flat surfaces on a plunger, the roller being disposed between the plunger and each detent and the roller being eccentrically mounted in order to move the detent by an amount equal to the height of the inclined surface plus the eccentricity of the roller.

Another object of the invention is the provision of an extensible and retractable device having manually releasable positive locking means in which the device is positively locked at one end of the stroke by radially movable cam actuated detents and which may be released only upon actuation of a manually operable release means, there being provided one or more other positions at which the device may be locked, release from such positions being accomplished by the application of force to the movable element which operates to cam the detents out of locking recesses provided at such other locations.

A further object of the invention is the provision of an extensible and retractable device having manually releasable positive locking means for locking the device at one end of the stroke and means for locking the device at one or more other locations, release from such other locations being accomplished by the application of an excess force to the movable element of the device, the force required to accomplish such release being predetermined.

Further objects and advantages of the invention will be apparent from the following description taken in conjunction with the accompanying drawings wherein:

FIG. 1 is a longitudinal sectional view of an extensible and retractable device and manually releasable positive locking means constructed in accordance with this invention and showing the device positively locked in position at one end of the stroke;

FIG. 2 is a fragmentary sectional view, similar to FIG. 1, and showing the device releasably locked in another position;

FIG. 3 is a sectional view taken substantially on the line 3—3 of FIG. 2;

FIG. 9 is a fragmentary sectional view similar to FIG. 4, showing a locking detent in locked position, but with the cam rollers secured in the inner end of the detent and with the inclined and flat surfaces on the actuating plunger;

FIG. 10 is a fragmentary sectional view similar to FIG. 9 and showing the detent in unlocked position;

Figure 5:
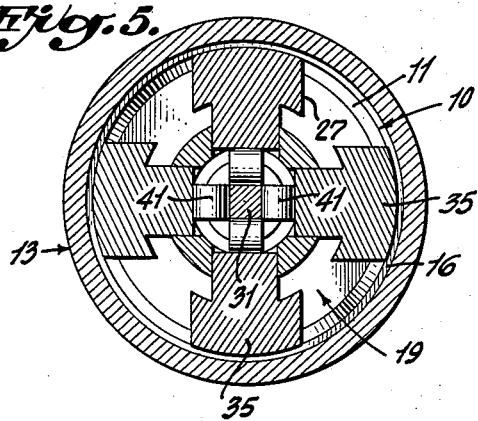
FIG. 5 is a sectional view taken substantially on the line 5—5 of FIG. 1 and showing the locking detents in extended or locking position.

FIG. 11 is a fragmentary sectional view similar to FIG. 9 and showing a further modified form of actuating mechanism for the locking detents in which the detent is in locked position and with a flat surface on the inner end of the detent engaged by a roller eccentrically mounted, the roller in turn engaging inclined and flat surfaces on an actuating plunger to move the detent and lock the same in position;

FIG. 12 is a fragmentary sectional view similar to FIG. 11, but showing the detent in unlocked position;

FIG. 13 is a sectional view taken substantially on the line 13—13 of FIG. 12.

With continued reference to the drawings and particularly FIGS. 1 and 2, there is shown an extensible and retractable device and locking means which may well comprise an elongated hollow cylinder 10, one end surface of the cylinder 10 being beveled outwardly as shown at 11. A cylinder head 13 may be detachably secured to the end of the cylinder 10, having the beveled surface 11, by screw threaded fastening means 14 or by any other suitable means, and it is to be noted that the cylinder head 13 is provided with an inner annular shoulder 15 which is spaced from the beveled end surface 11 of the cylinder 10 to provide an inwardly opening annular recess 16 between the beveled end surface 11 on the cylinder 10 and the cylinder head 13. The purpose of such annular recess 16 will be later described. The cylinder head 13 may be provided with an axially extending ear or boss 17 having an aperture 18 therein which may be utilized to attach the device to a cooperating structure.

A piston 19 is slidably received in the cylinder 10 and detachably connected to the piston 19 by screw threaded fastening means or the like 20 is a piston rod 21 which may project from the end of the cylinder opposite to the cylinder head 13 and may be provided on the outer end there of with screw threaded or other suitable means 22 for attaching the piston rod 21 to a cooperating structure. A cylinder head 23 may be detachably secured to the cylinder 10 at the end opposite from the cylinder head 13 by screw threaded or other suitable fastening means 24 and the cylinder head 23 may be provided with an aperture 25 for slidably engaging and guiding the piston rod 21. If desired, the cylinder head 13, as well as the cylinder head 23 may be provided with vent openings in order to prevent a build-up of pressure at either side of the piston 19 during movement thereof in the cylinder 10 or if desired, the vent openings may be omitted in order to provide a fluid pressure cushion at either end of the stroke of the piston 19 of the cylinder 10.

A central axial bore 26 is provided in the piston 19, such bore opening toward the cylinder head 13 and also provided in the piston 19 are a plurality of radial apertures 27 communicating with the bore 26. A second bore 28 of smaller diameter and concentric with the bore 26 is provided in the piston 19 and the structure is such as to provide a sleeve 29 between the bore 26 and the bore 28. A plunger 30 is slidably disposed in the second bore 28 and the plunger 30 is provided with an annular flange 31 on the outer end thereof. A washer 32 engages the inner end of the flange 31 and the washer 32 is in turn engaged by one end of a compression spring 33 received in the bore 26, the opposite end of the compression spring 33 engaging the inner end 34 of the bore 26.

Locking detents in the form of cylindrical bolts 35 are slidably disposed in the apertures 27 and the outer ends of the detents 35 are provided with beveled surfaces 36 and 37 on opposite sides of each detent, it being noted that the beveled end surface 36 cooperates with the beveled end surface 11 on the cylinder 10 as shown in FIG. 1. The inner ends of the detents 35 are provided with inclined surfaces 38 terminating in flat surfaces 39 which merge into arcuate surfaces 40 and such surfaces serve to engage cam rollers 41 mounted in the flange 31 of the plunger 30.

Figure 4:
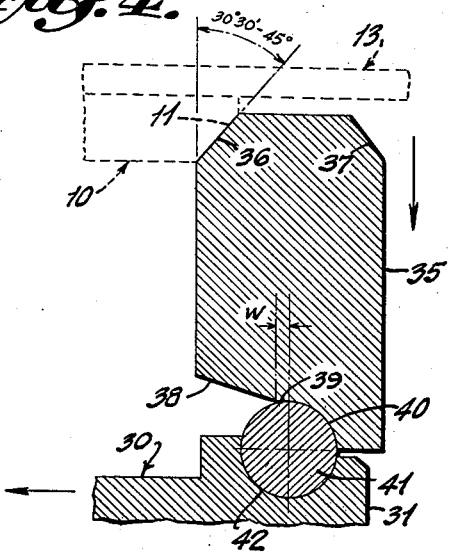
FIG. 4 is a fragmentary sectional view showing the details of the locking detents of FIG. 1, together with the mounting for the cam roller engaging such detents.

With particular reference to FIGS. 1 and 4, it will be noted that the inclined surface 38 terminates in a flat surface 39 having a width at least equal to the distance $w$ and merging into the arcuate surface 40. An arcuate recess 42 is provided in the flange 31 of the plunger 30 opposite each locking detent 35 and received in each arcuate recess 42 is a cam roller 41. It will be noted from an inspection of FIG. 4, that the angular length of the arcuate recess 42 is greater than one hundred eighty degrees and consequently, the roller 41 cannot be removed therefrom except axially of the roller 41 upon removal of the plunger 30 from the bore 28 in the piston 19. While the locking detents 35 have been shown and described as being cylindrical, it is to be understood that the same may be of any other desired shape or formation, but for convenience of manufacture, the cylindrical shape is to be preferred.

In FIG. 1, the piston 19 and piston rod 21 is shown locked in retracted position by engagement of the outer beveled ends 36 of the detents 35 with the beveled end surface 11 of the cylinder 10 with the outer ends of the detents 35 disposed in the annular recess 16 and in order to operate the device to permit movement of the piston 19 and extension of the piston rod 21, it is necessary to release the locking mechanism to permit retraction of the locking detents from the annular recess 16 whereby upon application of an axial force to the piston rod 21, the same, as well as the piston 19 may be moved in the cylinder 10 toward the right as viewed in FIG. 1. In order to accomplish release of the locking mechanism there is provided a manually operable lock releasing pin 43 which is slidably disposed in an aperture 44 of the cylinder head 13 in axial alignment with the plunger 30 and the pin 43 is provided on the inner end with a head 45 for engaging a projection 46 on the outer end of the flange 31 of the plunger 30. The pin 43 projects into an opening 47 in the cylinder head 13 and the outer end of the pin 43 may be provided with a finger engaging knob 48 to permit convenient actuation of the pin 43 by the finger of the operator inserted in the opening 47 and engaging the finger engaging knob 48. A bore 49 may be provided in the cylinder head 13 concentric with the pin 43 and communicating with the opening 47 and disposed in the bore 49 surrounding the pin 43 is a compression spring 50, one end of which engages the inner end 51 of the bore 49, the opposite end engaging a cross pin 52 in the pin 43 to urge the pin 43 outwardly to inoperative position, as shown in FIG. 1.

Actuation of the pin 43 toward the right as viewed in FIG. 1, serves to move the plunger 30 inwardly of the piston 19 against the action of compression spring 33 which serves to disengage rollers 41 from the flat surfaces 39 on the inner ends of the detents 35 and into engagement with the inclined surfaces 38 which permits inward movement of the detents 35, such movement being accomplished upon application of a force to the piston rod 21 to move such rod and the piston 19 toward the right as viewed in FIG. 1, which movement will result in the camming action provided by the engagement of the beveled outer end surfaces 36 on the detents 35 with the beveled end surface 11 on the cylinder 10 moving the detents 35 inwardly out of the annular recess 16 thereby permitting movement of the piston 19 and piston rod 21 toward the right as viewed in FIG. 1. If desired, free movement of the piston 19 to the opposite end of the cylinder may be permitted and upon return of the piston to the left hand end of the cylinder as viewed in FIG. 1, the same will again be positively locked in position by reason of the fact that the compression spring 33 will move the plunger 30 toward the left as viewed in FIG. 1 which will operate to engage the cam rollers 41 with the inclined surfaces 38 to move the detents 35 outwardly into the annular recess 16 and into engagement with the beveled end surface 11 on the cylinder 10, the detents 35 being locked in outermost locking position by engagement of the rollers 41 with the flat surfaces 39 on the inner ends of the detents 35. The piston 19 and piston rod 21 will remain locked in this position until the pin 43 is again actuated to release the locking detents 35.

In some instances, it may be desirable to releasably lock the piston 19 and piston rod 21 at one or more intermediate points of travel in the cylinder 10 and for this purpose there may be provided spaced annular inwardly opening recesses 53 and 54 in the cylinder 10 and the opposite end walls of the recess 53 may be beveled as shown at 55 and 56, while the opposite end walls of the recess 54 may be beveled as shown at 57 and 58. With particular reference to FIG. 2, it will be seen that upon movement of the piston 19 and piston rod 21 toward the right, locking detents 35 will be moved outwardly into the annular recess 53 by the action of the compression spring 33 and this will serve to lock the piston 19 and piston rod 21 in this position until such time as sufficient force is applied to the piston rod 21 to cam the locking detents 35 inwardly by engagement of the beveled end surface 36 with the beveled end wall 56 or by engagement of the beveled end surface 37 with the beveled end wall 55 of the annular recess 53. The same situation will exist with the locking detents 35 received in the annular recess 54 at which time the application of sufficient force to the piston rod 21 will result in camming the locking detents 35 inwardly by engagement of the beveled end surfaces 36 with the beveled end wall 58 or by engagement of the beveled end surfaces 37 with the beveled end wall 57 of the annular recess 54. The force required on the piston rod 21 to cam the locking detents 35 inwardly out of the annular recess 53 or annular recess 54 may be predetermined by calibration of the compression spring 33 which, together with engagement of the cam rollers 41 with the inclined surfaces 38 determines the force required to move the locking detents 35 inwardly. Thus, the piston 19 and piston rod 21 may be positively locked at the left hand limit of travel as shown in FIG. 1, or may be selectively releasably locked in the annular recess 53 or 54 as shown in FIG. 2, or if desired, the annular recesses 53 and 54 may be omitted and free movement of the piston 19 and piston rod 21 permitted except at the end of the stroke as shown in FIG. 1.

Figure 7:
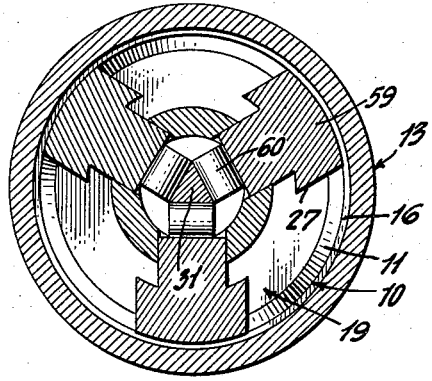
FIG. 7 is a sectional view similar to FIG. 5 and showing the position and use of three locking detents.
Figure 6:
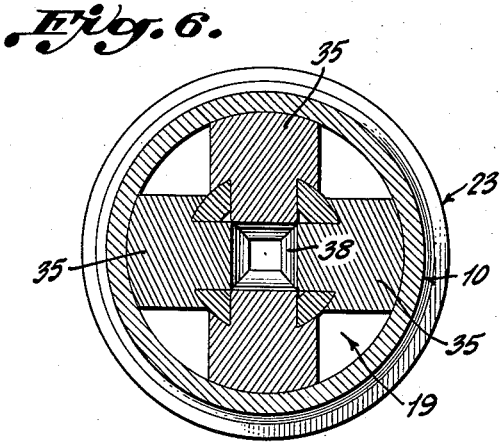
FIG. 6 is a sectional view similar to FIG. 5, but showing the locking detents in retracted or unlocked position.

Various arrangements of locking detents may be provided depending upon the size and load requirements and as shown in FIGS. 5 and 6, four locking detents 35 may be circumferentially spaced around the piston 19, the detents 35 being shown in locked position in FIG. 5 and in unlocked position in FIG. 6. With particular reference to FIG. 7, a modified arrangement of locking detents is shown in which three such detents 59 are slidably mounted in the radial apertures 27 of the piston 19 and such detents 59 are engaged by three associated cam rollers 60 mounted in the flange 31 of the plunger 30 and with the exception of the number of detents 59 and the disposition thereof, the structure and operation is the same as that described above in connection with the use of four locking detents as shown in FIGS. 1, 2 and 5.

Figure 8:
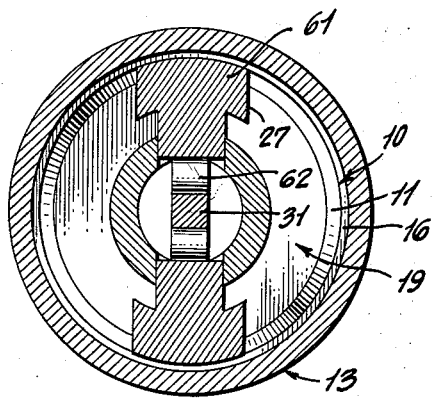
FIG. 8 is a sectional view similar to FIG. 5, but showing the use of two diametrically opposed locking detents.

A still further modified arrangement of locking detents is shown in FIG. 8 in which two such detents 61 are provided in diametrically opposed relationship in radial apertures 27 in the piston 19 and the detents 61 are engaged by rollers 62 mounted in the flange 31 of the plunger 30. This arrangement, of course, operates in the same manner as described above, in connection with FIGS. 1, 2 and 5. The locking detent arrangement shown in FIGS. 7 and 8 may be utilized where size and load requirements permit such an arrangement.

With particular reference to FIGS. 9 and 10, there is shown a modified form of locking cam means in which each of the radially movable detents 63 are provided with opposite beveled surfaces 64 and 65 on the outer ends thereof for cooperating with the beveled surfaces, such as the end surface 11 on the cylinder 10 and the beveled surfaces 56 and 55 of the annular recess 53 and beveled surfaces 57 and 58 of the annular recess 54 and in which the detent 63 is provided at the inner end thereof with an arcuate recess 66 which serves to rotatably receive a cam roller 67. It is to be noted that the annular length of the arcuate recess 67 is greater than one hundred eighty degrees and, therefore, the roller 67 is retained therein and may only be removed from the recess 66 in a direction axially of the roller 67 and such movement may only take place upon removal of the detents 63 from the apparatus.

The plunger 68 is provided with a flange 69 at the outer end thereof as in the structure previously described and such flange 69 is provided with an inclined surface 70 extending inwardly from the outer end 71 of the plunger 68 and the inclined surface 70 terminates in a flat surface 72 disposed at right angles to the longitudinal axis of the detent 63 and the inclined surface 70 may terminate at the opposite end thereof in an arcuate surface 73.

As shown in FIG. 9, the detent 63 is in locked position and is held in such position by engagement of the roller 67 with the flat surface 72 on the flange 69 of the plunger 68 and since the flat surface 72 is disposed at right angles to the longitudinal axis of the detent 63, any tendency of the detent 63 to move inwardly will be prevented, since no camming action can be exerted by the roller 67 against the flat surface 72. When it is desired to permit movement of the detent 63 to unlocked position as shown in FIG. 10, the plunger 68 is moved toward the left as viewed in FIG. 9, at which time the roller 67 will move away from the flat surface 72 and engage the inclined surface 70 to permit the detent 63 to move radially inwardly in the piston 19. Disengagement of the roller 67 from the inclined surface 70 may be prevented by engagement of the roller 67 with the arcuate surface 73 on the outer end of the flange 69 of the plunger 68, but, of course, other means for preventing such disengagement may be utilized if such is desired. The detent 63 is shown in unlocked position in FIG. 10, when it is desired to again move the detent 63 into locked position, it is only necessary to permit the plunger 68 to move toward the right, at which time, the roller 67 will move up the inclined surface 70 to move the detent 63 outwardly and upon engagement of the roller 67 with the flat surface 72, the detent 63 will again be locked in locking position.

A still further modified form of locking cam means is shown in FIGS. 11 to 13 in which a locking detent 74 is movable radially in the piston and the inner end of the detent 74 is provided with a flat surface 75 disposed at substantially right angles to the longitudinal axis of the detent 74 and the flat surface 75 merges into an arcuate surface 76. A plunger 77 is provided on the outer end thereof with a flange 78 which in turn is provided with an inclined surface 79 terminating in a flat surface 80 disposed at substantially right angles to the longitudinal axis of the detent 74 and the opposite end of the inclined surface 79 may if desired, terminate in an arcuate surface 81 at the outer end 82 of the plunger 77. A cam roller 83 is disposed between the inner end of the locking detent 74 and the flange 78 of the plunger 77 and the roller 83 is provided at opposite ends thereof with eccentrically disposed trunnions 84 which serve to rotatably and eccentrically mount the roller 83 in the piston of the device.

In the operation of the locking cam means shown in FIGS. 11 to 13, the same is shown in locked position in FIG. 11 with the detent 74 projected outwardly and with the roller 83 engaging the flat surface 75 on the detent 74, as well as the arcuate surface 76 which is of the same radius as the roller 73 and also engaging the flat surface 80 on the flange 78 of the plunger 77. The detent 74 is locked in such position by reason of the fact that no camming action can take place between the flat surfaces 75 and 80 and the roller 83 as the result of an inward force exerted on the detent 74. When it is desired to release the detent 74 from locking position, it is only necessary to move the plunger 77 toward the left as viewed in FIG. 11, at which time the roller 83 will move from the flat surface 80 onto the inclined surface 79 which will permit movement of the detent 74 inwardly, but at the same time, the roller 83 will rotate on the eccentric trunnions 84 and will also move away from the arcuate surface 76 as shown in FIG. 12, which results in movement of the detent 74 an amount equal to the sum of the height of the inclined surface 79 and the eccentricity of the roller 83. Disengagement of the roller 83 from the inclined surface 79 may if desired, be prevented by engagement of the roller 83 with the arcuate surface 81 at the outer end 82 of the flange 78 of the plunger 77, although other means for this purpose may be utilized if desired. When it is desired to return the detent 74 to locking position, it is only necessary to move the plunger 77 toward the right as viewed in FIG. 12, at which time, the roller 83 will move off the inclined surface 79 and at the same time, the roller 83 will rotate about the eccentric trunnions 84 which will result in moving the detent 74 outwardly an amount equal to the sum of the height of the inclined surface 79 as well as the eccentricity of the roller 83. Continued movement of the plunger 77 toward the right will result in the roller 83 engaging the flat surface 80 on the flange 78 of the plunger 77, as shown in FIG. 11, to again lock the detent 74 in outermost locking position.

It will be obvious that by the above described invention there has been provided a relatively simple, yet highly effective extensible and retractable device having a manually releasable positive locking means in which the locking mechanism is relatively simple and strong, the structure being such as to eliminate all levers or toggle mechanism and also providing a structure which is substantially foolproof in operation, but which may be easily repaired or replaced in the event of wear or failure.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. An extensible and retractable device and locking means comprising an elongated hollow cylinder, one end surface of said cylinder being beveled outwardly, a cylinder head threadedly received on one end of said cylinder, an inwardly opening annular recess between said head and the adjacent end of said cylinder, means on said head for attaching the same to a cooperating structure, a piston slidably received in said cylinder, a piston rod connected to said piston and projecting from the opposite end of said cylinder, a central axial bore in said piston opening toward said head, a radial aperture in said piston communicating with said bore, a second bore in said piston concentric with said first bore and of smaller diameter, a plunger slidably disposed in said second bore, an annular flange on the outer end of said plunger, a compression spring between said flange and the inner end of said first bore, a locking detent slidably disposed in said radial aperture, a beveled surface on the outer end of said detent, cooperating locking cam means on the inner end of said detent and on said flange, said means including a roller and a camming surface, said roller rotatably engaging said camming surface as the detent moves, a manually operable lock releasing pin slidably mounted in said head for engaging the outer end of said plunger and spring means for urging said pin outwardly, whereby with said piston at said one end of said cylinder said detent will be cammed outwardly into said recess and locked in position by said locking cam means to lock said piston against movement and upon actuation of said pin to force said plunger inwardly, said detent may move inwardly to permit movement of said piston upon application of a force to said piston rod.

2. An extensible and retractable locking device and locking means as defined in claim 1, in which said locking cam means comprises an inclined surface on the inner end of said detent, said inclined surface terminating in a flat surface disposed at right angles to the longitudinal axis of said detent, said flat surface merging into an arcuate surface, an arcuate recess in said flange opposite said detent, the angular length of the recess in said flange being greater than one hundred eighty degrees and a roller rotatably received in said last-named recess with the axis of said roller being disposed at right angles to the longitudinal axis of said detent, the radius of said roller being substantially equal to the radius of said last-named arcuate surface, whereby said roller engages said inclined surface to move said detent outwardly and engage said flat surface and said arcuate surface in said detent to lock said detent in outermost position.

3. An extensible and retractable device and locking means as defined in claim 1, in which said locking cam means comprises an arcuate recess in the inner end of said detent, the angular length of said recess being greater than one hundred eighty degrees, a roller rotatably received in said recess with the axis of said roller being disposed at right angles to the longitudinal axis of said detent, an inclined surface extending inwardly from the outer end of said flange opposite said detent, said inclined surface terminating in a flat surface disposed at right angles to the longitudinal axis of said detent, whereby said roller engages said inclined surface to move said detent outwardly and engage said flat surface to lock said detent in outermost position.

4. An extensible and retractable device and locking means as defined in claim 1, in which said locking cam means comprises a flat surface on the inner end of said detent, said flat surface being disposed at right angles to the longitudinal axis of said detent and merging into an arcuate surface, an inclined surface extending inwardly from the outer end of said flange opposite said detent, said inclined surface terminating in a second flat surface disposed at right angles to the longitudinal axis of said detent, a roller disposed between said detent and said flange, said roller being eccentrically mounted in said piston with respect to the longitudinal axis of said detent, the radius of said roller being substantially equal to said arcuate surface, whereby said roller engages said inclined surface to move said detent outwardly an amount equal to the height of said inclined surface plus the eccentricity of said roller and engage said second flat surface and said arcuate surface to lock said detent in outermost position.

5. An extensible and retractable device and locking means comprising an elongated hollow cylinder, one end surface of said cylinder being beveled outwardly, a cylinder head threadedly received on said one end of said cylinder, an inwardly opening annular recess between said head and the adjacent end of said cylinder, a piston slidably received in said cylinder, a piston rod connected to said piston and projecting from the opposite end of said cylinder, a central axial bore in said piston opening toward said head, a plurality of radial apertures in said piston communicating with said bore, a second bore in said piston concentric with said first bore and of smaller diameter, a plunger slidably disposed in said second bore, an annular flange on the outer end of said plunger, a compression spring between said flange and the inner end of said first bore, locking detents slidably disposed in said radial apertures, beveled surfaces on opposite sides of the outer end of each detent, cooperating locking cam means on the inner ends of said detents and on said flange, said means including a roller and a camming surface, said roller rotatably engaging said camming surface as the detent moves, second and third spaced inwardly opening annular recesses in said cylinder spaced from said first recess, the opposite end walls of said second and third recesses being beveled, the diameter of said first named recess being greater than the respective diameters of said second and third recesses whereby a positive locking action is obtained in said first recess and a selectively releasable locking action is obtained in said second and third recesses upon the application of force to said piston rod, a manually operable lock releasing pin slidably mounted in said head for engaging the outer end of said plunger and spring means for urging said pin outwardly, whereby with said piston at said one end of said cylinder said detents will be cammed outwardly into said first recess and locked in position by said locking cam means to lock said piston against movement and upon actuation of said pin to force said plunger inwardly said detents may move inwardly to permit movement of said piston upon application of a force to said piston rod, said detents engaging said second or third recesses to limit movement of said piston, additional force exerted on said piston rod serving to cam said detents out of said second or third recesses to permit return of said piston to said one end of said cylinder, said detents engaging said first recess under the action of said compression spring to lock said piston against further movement.

References Cited in the file of this patent
UNITED STATES PATENTS

| | | |
|---|---|---|
| 1,346,341 | Schinkez | July 13, 1920 |
| 2,764,132 | Bakke | Sept. 25, 1956 |
| 2,974,638 | Chace | Mar. 14, 1961 |
| 2,997,985 | Chace | Aug. 29, 1961 |
| 3,002,368 | Moberg | Oct. 3, 1961 |
| 3,008,454 | Wilkins | Nov. 14, 1961 |
| 3,022,771 | Chace | Feb. 27, 1962 |